(12) United States Patent
Hu et al.

(10) Patent No.: US 9,449,115 B2
(45) Date of Patent: Sep. 20, 2016

(54) METHOD, CONTROLLER, PROGRAM AND DATA STORAGE SYSTEM FOR PERFORMING RECONCILIATION PROCESSING

(71) Applicant: FUJITSU LIMITED, Kawasaki-shi, Kanagawa (JP)

(72) Inventors: Bo Hu, Huntingdon (GB); Loredana Laera, London (GB)

(73) Assignee: FUJITSU LIMITED, Kawasaki (JP)

( * ) Notice: Subject to any disclaimer, the term of this patent is extended or adjusted under 35 U.S.C. 154(b) by 501 days.

(21) Appl. No.: 13/904,467

(22) Filed: May 29, 2013

(65) Prior Publication Data
US 2013/0332490 A1 Dec. 12, 2013

(30) Foreign Application Priority Data

Jun. 11, 2012 (GB) .................................. 1210234.9
Jun. 28, 2012 (EP) ..................................... 12174230

(51) Int. Cl.
G06F 7/00 (2006.01)
G06F 17/30 (2006.01)
G06N 5/02 (2006.01)

(52) U.S. Cl.
CPC ... *G06F 17/30958* (2013.01); *G06F 17/30734* (2013.01); *G06N 5/02* (2013.01)

(58) Field of Classification Search
CPC ................................................. G06F 17/30958
See application file for complete search history.

(56) References Cited

U.S. PATENT DOCUMENTS 7,512,612 B1 *  3/2009  Akella .............. G06F 17/30958
2007/0073737 A1 *  3/2007  Patterson ............... G06Q 10/06

OTHER PUBLICATIONS

International Search Report mailed Mar. 15, 2013 in corresponding European Application No. 12174230.8.
R. Kolli, "Scalable Matching of Ontology Graphs Using Partitioning," B.E, Osmania University, India (2006) and Thesis submitted to University of Georgia, Athens, GA, USA (Aug. 2008) pp. ii-65.
N. Noy et al., "The PROMPT suite: interactive tools for ontology merging and maping," International Journal of Human-Computer Studies 59 (2003) pp. 983-1024.
Wei Hu et al., "Falcon-AO: A practical ontology matching system," Web Semantics: Science, Service and Agents on the World Wide Web 6 (2008) pp. 237-239.
Kalyanpur et al., "Debugging unsatisfiable classes in OWL ontologies," Jounal of Web Semantics: Services and Agents on the World Wide Web 3 (2005) pp. 268-293.
Notification of First Office Action including Search Report mailed Feb. 2, 2016 in Chinese Patent Application No. 201310231665.9.
"Scalable Matching of Ontology Graphs Using Partitioning", Ravikanth Kolli, 2008, 76 pages.

* cited by examiner

*Primary Examiner* — Ajith Jacob
(74) *Attorney, Agent, or Firm* — Staas & Halsey LLP

(57) ABSTRACT

A method, program, and data storage system for performing reconciliation of resources represented in a graph of data as nodes, comprising selecting an initial subset of the nodes of the graph for which reconciliation processing with a particular node is to be carried out, performing reconciliation processing between the particular node and each of the initial subset of nodes, and delaying reconciliation processing between the particular node and a further subset of the nodes of the graph for which reconciliation with the particular node is to be carried out.

15 Claims, 10 Drawing Sheets

Reconciliation Process

Figure 9. Distribution & Parallelisation of Similarity Tasks

Figure 10. Two Dimensional Data Segmentation

METHOD, CONTROLLER, PROGRAM AND DATA STORAGE SYSTEM FOR PERFORMING RECONCILIATION PROCESSING

CROSS-REFERENCE TO RELATED APPLICATIONS

This application is based upon and claims the benefit of priority of the prior United Kingdom Patent Application No. 1210234.9, filed on Jun. 11, 2012, in the United Kingdom Intellectual Property Office and European Patent Application No. 12174230.8, filed Jun. 28, 2012, in the European Intellectual Property Office, the disclosures of which are incorporated herein by reference.

BACKGROUND OF THE INVENTION

The present invention lies in the field of data storage and the associated processing. Specifically, embodiments of the present invention relate to the performance of reconciliation processing resources in a graph representation of a dataset. The reconciliation processing is intended to reconcile heterogeneity between semantically corresponding resources in the graph.

The enormous volume of graph data available creates potential for automated or semi-automated analysis that can not only reveal statistic trends but also discover hidden patterns and distil knowledge out of data. Formal semantics plays a key role in automating computation-intensive tasks. While there is a longstanding battle over how semantics are best captured, it is widely regarded that graphs and graph-like representations are the best instrument to emulate how humans perceive the world (as an ontology with entities and relationships among entities).

Graph databases, therefore, offer the advantage of naturally presenting "semantic networks"-based knowledge representation that can store large amounts of structured and unstructured data.

A graph database is a data representation which employs nodes and edges (or arcs) to represent entities, and arcs between nodes to represent relationships between those entities. Graph databases are used in a wide variety of different applications that can be generally grouped into two major categories. The first consists of complex knowledge-based systems that have large collections of concept descriptions (referred to as "knowledge-based applications"), such as intelligent decision support and self learning. The second includes applications that involve performing graph analysis over transactional data (referred to as "transactional data applications"), such as social data and business intelligence.

At the heart of formalised graph databases is the Resource Description Framework, RDF, a simple graph-based data modelling language providing semantic mark-up of data. With RDF, data silos can begin to be pieced together and the current archipelagic data landscape transformed into a connected data graph upon which complicated data analytics and business intelligence applications can be built.

Data sets may be generally highly heterogeneous and distributed. The decentralised nature of such data leads to the issue that often many data sources use different references to indicate the same real world object. A necessary and important step towards utilising available graph data effectively is to identify and reconcile multiple references for semantic consistence. Hereinafter, the term "reconciliation" is used to indicate the process of reconciling heterogeneity between resources (as nodes in a graph of data, for example, as the subject or object of RDF triples) by identifying and defining equivalence links among resources that correspond semantically to each other. It follows that "reconciliation processing" is the execution of algorithms and instructions by a processor in order to achieve reconciliation.

The significance of data reconciliation is evident. Data reconciliation ensures data integrity when heterogeneous data sets are linked (resulting in semantic variety in data). Meaningful analysis cannot be performed otherwise. Meanwhile, equivalencies allow applications to align with each other. Communications among the applications can, therefore, be automated and delegated to computers.

SUMMARY OF THE INVENTION

Embodiments of the present invention provide a method for performing reconciliation of resources represented in a graph of data as nodes; the method comprising: selecting an initial subset of the nodes of the graph for which reconciliation processing with a particular node is to be carried out; performing reconciliation processing between the particular node and each of the initial subset of nodes; delaying reconciliation processing between the particular node and a further subset of the nodes of the graph for which reconciliation with the particular node is to be carried out.

Equivalence links can be created either during or after the creation of a graph. In existing reconciliation processes, the process to find equivalence links is performed simultaneously (in a single routine) against the entire dataset. This could be a significant source of inefficiency if one considers a large amount of data (in the size of billions of nodes). Reconciliation is a complex, tedious and time-consuming process, as well as being generally expensive. Reconciliation algorithms often perform computationally intensive operations which can be considerably time-consuming. This poses a number of challenges towards their practical applicability for real complex tasks and efficient utilisation of the computing architectures that best fit the data requirements to get maximal performance and scalability. The amount of data that is available is growing and therefore, the amount of data available to be reconciled is often not manageable by existing approaches and tools. In order to be able to reconcile large amounts of data, a severe focus on scalability issues is desirable.

The data in the graph may be referred to as "connected data", "graph data", "linked data", or "related data", amongst other phrases—all of which are intended to reflect the conceptual structure of a graph as a plurality of nodes interconnected by arcs. In certain implementations, the data in the graph may be "linked data" as in data provided as part of the "Open Linked Data" (LOD) initiative—although embodiments of the present invention are not restricted to such implementations, and the term "linked data" may be interpreted more broadly than only data provided as part of the LOD initiative.

By providing a process by which reconciliation processing is performed, but not necessarily all in a single routine, a scalability is enabled. That is to say, some reconciliation processing can be performed on addition of a new node to the graph, or on addition of a new data item (such as a triple) having a node as subject, but the reconciliation processing is not necessarily with the entire set of nodes in the graph, merely a subset. The size of that initial subset does not necessarily have to increase as the size of the graph increases, and hence the processing required for the initial reconciliation processing does not become unfeasible as the graph grows.

Furthermore, by reducing the requirement to perform reconciliation processing against the entire graph in one pass or one routine, the bottleneck caused by reconciliation processing of new nodes is eased. This improves performance of the system as a whole, and also enables the system operator to tend towards more complex and hence potentially more effective reconciliation algorithms, without worrying about adverse impact on system performance.

Reconciliation of resources may be a process of reconciling heterogeneity between resources in a graph by identifying and producing equivalence links between resources (represented by nodes in the graph) which correspond to one another semantically. For example, where two resources having different names refer to the same real-world object (i.e. the two resources are semantically equivalent/equivalent in meaning), it would be appropriate to add a link to the graph indicating that the two resources are equivalent. Reconciling resources may include identifying where equivalences exist between resources (graph nodes are a resource), and adding an indication of the equivalence to the graph. The identification of multiple resources or representations of the same real world entity is also known as ontology mapping, ontology matching, or ontology alignment.

A resource may be a web resource dereferencable by a URI, and may be a representation (description) of an entity that is being described by data in the graph. A particular entity may be represented by one or more resources.

Delaying reconciliation processing may include stopping performing the processes of identifying semantic equivalence between resources and adding links to the graph indicating those semantic equivalences, and then waiting for one of a predetermined set of trigger events, or for a decision made by a task scheduler in response to the state (such as usage/workload) of computing resources in the system, before resuming said processes.

In embodiments of the present invention, selecting the initial subset may include determining which of the nodes have the highest number of read accesses made to them in graph traverse operations, and including those nodes in the initial subset as most visited nodes.

The size of the initial subset may be controllable by a system administrator, or may be preset, and may be, for example, a set number of nodes or a set proportion of nodes in the graph. A graph traversal operation may include visiting/reading graph nodes in a particular manner; eventually all nodes might be visited where the method of visiting can affect the efficiency of the traversal algorithm. Advantageously, by selecting the most-visited nodes in the initial subset, the reconciliation processing is completed between the particular node and those nodes most likely to be queried. Hence, it is likely that nodes read as part of a query to the graph have had reconciliation processing performed with other nodes in the graph.

In addition, selecting the initial subset may also include determining which of the nodes have the highest probability of having a read access made to them as the next node after one of the most visited nodes in a graph traverse operation.

Advantageously, in this particular method, co-occurrence with the most-visited nodes is also used as a basis for selection in the initial subset. This extends the range of nodes that will have had reconciliation processing performed with a high proportion of the other nodes when queried, and the extension is directed in a manner which is sympathetic to the mechanism by which read accesses to the nodes are made. By using a co-occurrence association rule to identify those nodes which are most likely to be visited after one of the most-visited nodes in a graph traverse operation, the reconciliation processing performed for the most-visited nodes can also be performed (be propagated) for the identified nodes, as part of the initial subset.

In an alternative implementation, it may be that the nodes having the highest probability of having a read access made to them as the next node after one of the most visited nodes in a graph traverse operation are identified as a further subset for which reconciliation processing is delayed. For example, further subsets may each be associated with a range of probabilities of nodes having a read access made to them as the next node after one of the most visited nodes in a graph traverse operation, and the nodes can be allocated to a further subset in dependence upon said probability.

In implementations in which it has been determined that, at one time or another, each node must have reconciliation processing performed between itself and each other node, the further subset of the nodes is all of the nodes in the graph that are not members of the initial subset. However, the further subset of nodes may not necessarily all have reconciliation performed with themselves and the particular node in a single routine, but may be split into additional further subsets, with delays between the reconciliation processing for each additional further subsets.

Performing reconciliation processing between each node and each of the other nodes is desirable because it allows several applications utilising or analysing the data in the graph to align with one another and facilitates communication among them. For example, a data harvester can follow the equivalence links produced by reconciliation processing to navigate through a potentially endless web of data.

Optionally, the reconciliation processing of the further subset of the nodes may be delayed and performed during time slots when monitoring of computing resources indicates the computing resources would otherwise be idle.

It may be that reconciliation processing is only performed at system idle time. Optionally, it may be that reconciliation processing of the particular node with the initial subset is performed at a time determined by events in the graph, for example, at the time of insertion of a new data item (such as an RDF triple) to the graph, and that the reconciliation processing between the further subset and the particular node is delayed until system idle time. System idle time is used here as convenient notation for a range of operating states in which there is capacity to handle the extra processing burden imposed by reconciliation processing, at the resource responsible for the reconciliation processing. For example, it may be that reconciliation processing of the further subset is performed by the processor when there are no other pending tasks at the processor. Such decisions may be taken by a centralised workload scheduler (having the functionality of a reconciliation processing control module) or locally at the processor itself. That is to say, it may be that the decision of when to perform reconciliation processing between the particular node and the further subset of nodes is taken in dependence upon the operating state of the computing resource responsible for performing said processing.

Methods embodying the present invention may further comprise: adding an identification of the particular node to a list; maintaining the identification of the particular node in the list until processing with the further subset of the nodes of the graph has been carried out, whereupon the identification of the particular node is removed from the list; and when a query to the graph is received identifying one or more nodes to be read, checking which of the one or more nodes to be read are identified on the list, and for each of the one or more nodes to be read that is identified on the list, carrying out reconciliation processing with each node of the graph.

Such a list could be maintained centrally, by an entity having the function of a reconciliation controller (such as a reconciliation processing control module) or system controller. Alternatively, it may be that the list is realised within a distributed architecture, and is realised by more than one node of a distributed system working in cooperation with one another. In some implementations, it may be desirable for reconciliation processing to be completed for a particular node before it is returned as part of a response to a query, or read as part of a response to a query. Advantageously, maintaining a list of those nodes for which complete reconciliation processing (that is, reconciliation processing with each other node in the graph) has not yet been performed enables easy identification of the reconciliation processing which needs to be performed before returning a response to a query. The identification of the node on the list may be, for example, a name or a URI. The identification of a particular node may remain on the list until reconciliation processing with the further subset of nodes has been either initiated or completed, depending on the implementation.

Additionally or alternatively, for each node of the graph not included in the initial subset with which reconciliation processing is carried out, a method embodying the present invention may include adding an identification of the particular node to a list of unreconciled nodes in the associated metadata, and maintaining said identification in said list until reconciliation processing with the particular node is carried out, whereupon the identification of the particular node is removed from said list; and when a query to the graph is received identifying one or more nodes to be read, for each of the nodes to be read, carrying out reconciliation processing between that node and each of the nodes identified in the list of unreconciled nodes in the associated metadata.

There are implementations in which each of the nodes have associated metadata, which may be stored at the node or may be stored at a location linked to from the node or locatable based on an identification of the node. Each node has its own individual associated metadata. The metadata may include a list of nodes which have been reconciled with (=had reconciliation processing performed between themselves and) the initial subset of nodes, but not yet with the node in question. Advantageously, this enables control of reconciliation processing with the further subset of nodes to performed locally based on information available either at the node or accessible directly from the node.

Though not essential in embodiments of the present invention, implementations may include systems in which the graph is stored in a distributed network of computing resources. The distributed network of computing resources (storage nodes) may include a system of more than one distinct storage units in communication with one another. An exemplary communication paradigm is peer-to-peer (P2P), hence it may be that the distributed network of computing resources is a peer-to-peer network of storage nodes. P2P is a distributed architecture that partitions tasks or workloads between peers. Peers (individual storage nodes or processes) are equally privileged, equipotent participants in the application. Each peer is configured to make a portion of its resources, such as processing power, disk storage or network bandwidth, directly available to other network participants, without the need for central coordination by servers or stable hosts. Peers can be considered to be both suppliers and consumers of resources, in contrast to a traditional client-server model where servers supply and clients consume. Advantageously, a P2P system can maintain large groups of storage nodes exchanging messages with a logarithmic communication cost.

In terms of the actual process of performing reconciliation between two nodes, in embodiments of the present invention, reconciliation processing of the particular node with another node may comprise: obtaining a similarity value by aggregating the values resulting from performing a plurality of different similarity calculations, or obtaining a single value resulting from performing a similarity calculation, wherein a similarity calculation is a calculation generating a value representing the likelihood that the particular node and the another node are semantically equivalent; and if the similarity value exceeds a predetermined similarity threshold, adding an equivalence link to the graph denoting an equivalence relationship between the particular node and the another node.

Advantageously, embodiments of the present invention reduce the requirement to perform all of the reconciliation processing for a particular node at one time, or in a single routine. With the added flexibility of the incremental approach to reconciliation processing employed in embodiments of the present invention, a more robust algorithm or set of algorithms can be employed in the reconciliation processing itself, without impacting negatively on overall system performance. To that end, embodiments of the present invention may run a plurality of algorithms each giving a similarity value, or run a single, robust, algorithm giving a similarity value, and aggregate these values to obtain an overall similarity value for comparison with a threshold. It may be that each algorithm (or similarity calculation) give a yes/no (1/0) as to whether two nodes are semantically equivalent or not, and the threshold is the proportion of 'yes' results required from the total number of similarity calculations performed. Alternatively, a weighted average of a number of similarity calculations may be used to obtain a similarity value.

Depending on the manner in which an embodiment of the present invention is implemented, it may be that reconciliation processing is performed simultaneously on more than one computing resource within the distributed network of computing resources, between the particular node and the nodes being stored on that computing resource and belonging to the subset of nodes for which reconciliation processing with the particular node is being performed.

Distributed storage systems such as those which might be employed to store a graph of data impose a segmentation on the data by their nature. Advantageously, embodiments of the present invention may take advantage of this segmentation by performing parallel reconciliation for a particular node by performing reconciliation processing at each computing resource used for storage of nodes between the particular node and the graph nodes stored on that computing resource. It may be that some orthogonal segmentation of the data is performed, so that each computing resource does not perform reconciliation processing between the particular node and each of the nodes stored thereon in one routine, but splits the nodes up, for example, based on the frequency by which the nodes are visited in graph traverse operations. This orthogonal segmentation provides further flexibility in parallel processing implementations. It may be that the reconciliation processing between the particular node and an initial subset is performed centrally, and then the reconciliation processing between the particular node and the further subset is performed, and possibly also scheduled, locally.

Embodiments of the present invention may have their functionality enhanced or provided via the storage of certain statistics/values/properties/parameters/measurements as metadata stored on a per-node basis. Embodiments of the present invention may include storing, for each node, as associated metadata, a value representing the numbers of read accesses made to the node in graph traverse operations, and a value representing the number of times each node to which the node is linked in the graph was read as the next node in a graph traverse operation.

In embodiments of the present invention, knowledge, facts, and/or statements are represented by a graph of nodes and edges, where nodes are the entities being described or represented, and the edges are the relationships between those entities. Embodiments of the present invention may be configured to store graph data directly i.e. as nodes and edges. However, it may be that some other underlying data structure is employed.

As an exemplary underlying data storage structure, it may be that the data in the graph is encoded as triples each comprising a subject, a predicate, and an object, and the nodes of the graph are the subjects and objects of the triples, and the predicate of a triple denotes a link between the subject and the object of the triple.

Optionally, the triples may be Resource Description Framework (RDF) triples. Throughout this document, it should be understood that where specific references to "RDF triple(s)" are made, it is an exemplary form of triple, conforming to the RDF standard. Furthermore, references to "triple(s)" include the possibility that the triple in question is an RDF triple. Similarly, the RDF processors discussed elsewhere in this document are exemplary of processors used for interaction between the API wrapper and the stored data items.

The Resource Description Framework is a general method for conceptual description or modeling of information that is a standard for semantic networks. Standardising the modeling of information in a semantic network allows for interoperability between applications operating on a common semantic network. RDF maintains a vocabulary with unambiguous formal semantics, by providing the RDF Schema (RDFS) as a language for describing vocabularies in RDF.

Optionally, each of one or more of the elements of the triple (an element being the predicate, the object, or the subject) is a Uniform Resource Identifier (URI). RDF and other triple formats are premised on the notion of identifying things (i.e. objects, resources or instances) using Web identifiers such as URIs and describing those identified 'things' in terms of simple properties and property values. In terms of the triple, the subject may be a URI identifying a web resource describing an entity, the predicate may be a URI identifying a type of property (for example, colour), and the object may be a URI specifying the particular instance of that type of property that is attributed to the entity in question, in its web resource incarnation. The use of URIs enables triples to represent simple statements, concerning resources, as a graph of nodes and arcs representing the resources, as well as their respective properties and values. An RDF graph can be queried using the SPARQL Protocol and RDF Query Language (SPARQL). It was standardized by the RDF Data Access Working Group (DAWG) of the World Wide Web Consortium, and is considered a key semantic web technology. SPARQL allows for a query to consist of triple patterns, conjunctions, disjunctions, and optional patterns.

The triples provide for encoding of graph data by characterising the graph data as a plurality of subject-predicate-object expressions. In that context, the subject and object are graph nodes of the graph data, and as such are entities, objects, instances, or concepts, and the predicate is a representation of a relationship between the subject and the object. The predicate asserts something about the subject by providing a specified type of link to the object. For example, the subject may denote a Web resource (for example, via a URI), the predicate denote a particular trait, characteristic, or aspect of the resource, and the object denote an instance of that trait, characteristic, or aspect. In other words, a collection of triple statements intrinsically represents directional graph data. The RDF standard provides formalised structure for such triples.

Reconciliation processing between a node and an initial subset of nodes may be initiated upon entry of a new triple to the graph. Furthermore, it may be conditional on whether or not the subject of the new triple is itself new (in which case reconciliation processing is initiated for that 'particular node'), or not (in which case it is decided that no reconciliation processing is required).

Embodiments of a particular aspect of the present invention provide a database controller for performing reconciliation of resources represented in a graph of data as nodes; the database controller comprising: a selection module configured to select an initial subset of the nodes of the graph for which reconciliation processing with a particular node is to be carried out; a reconciliation processing module configured to perform reconciliation processing between the particular node and each of the initial subset of nodes; a reconciliation processing control module configured to delay reconciliation processing of a further subset of the nodes of the graph for which reconciliation with the particular node is to be carried out.

The database controller could be realised as a centralised controller on a single computing resource, as a centralised controller by a number of computing resources cooperating, or as a controller among a plurality of equivalent controllers each on a respective computing resource in a distributed storage system. For example, it may be that the database controller s provided by a program running on a computing resource in the storage system, and that one or more other computing resources are also running equivalent programs so that the database is accessible via a plurality of database controllers.

Embodiments of another aspect of the present invention provide a data storage system for storing a graph of data in which resources are represented as nodes of the graph, the data storage system comprising: a plurality of storage units each configured to store a segment of data from the graph of data; and a database controller as described above and/or elsewhere as an invention embodiment Of course, the data storage units are examples of computing resources, and may have processing functionality and control/management functionality in addition to storage.

The storage units may each be computing resources, for example, they may each include a storage unit, in addition to a processor, memory, and/or additional components such as a network interface card, a motherboard, input/output devices. Embodiments of another aspect of the present invention provide a computer program which, when executed by a computer, causes the computer to perform a method embodying the present invention. Furthermore, embodiments of another aspect of the present invention include a computer program, which, when executed by one or more computers, causes the one or more computers to function as a database controller embodying the present invention. Computer programs embodying the present invention may be stored on a computer-readable storage medium, such as a non-transient storage medium, and may be provided as a single computer program or as a suite of sub-programs.

Embodiments of the present invention implement an approach to performing reconciliation processing that has one or more of the following advantageous effects: reducing the computational effort of the reconciliation; breaking the processing down into smaller chunks to enable better scheduling of reconciliation tasks; taking advantage of distributed data storage to enable orthogonal segmentation of the data to increase parallel performance and improve scalability; enabling the execution of several similarity measures at the same time and on dispersed computer resources; is guided by a probability model to perform reconciliation.

Preferred features of the present invention will now be described, purely by way of example, with reference to the accompanying drawings, in which:

DETAILED DESCRIPTION OF THE PREFERRED EMBODIMENTS

Figure 1:
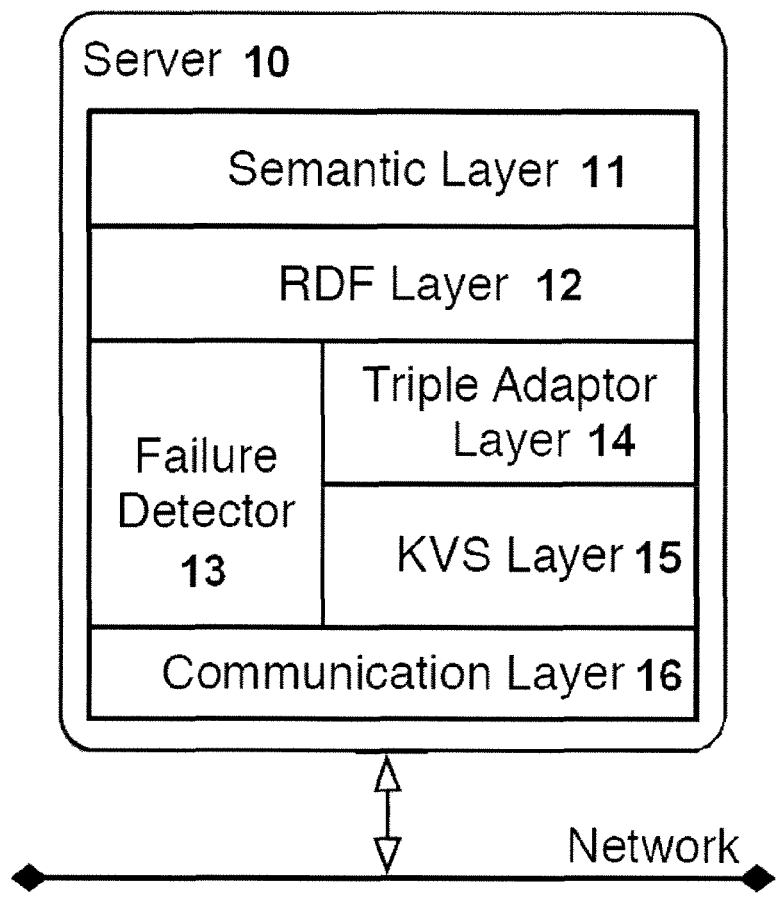
FIG. 1 is a schematic illustration of the software deployed on a server in a data storage system embodying the present invention.

FIG. 1 illustrates the architecture of software deployed on each server 10. In this particular example, the storage system is composed of a set of servers that communicate through a message passing system. In the example illustrated in FIG. 1, the servers implement a multi-layered model where each layer exploits and uses capabilities of the layers below. The architecture consists of, from the topmost one, a Semantic Layer 11, an RDF Layer 12, a Triple Adaptor Layer 14, a KVS Layer 15, and a Communication Layer 16 with a Failure detector 13 running alongside triple adaptor layer 14 and KVS layer 15. Of course, as will become clear in the description that follows, the embodiment discussed herein uses RDF triples as the underlying data structure for storing the graph of data. This is by no means the only underlying data structure that can be used in invention embodiments, but has been selected here for the purpose of presenting an exemplary implementation of invention embodiments. In addition, a KVS (Key Value Store) format is employed, in which the RDF triples themselves are used as keys for accessing further data (including metadata) in an associated value store. Again, the KVS format is selected for the purpose of presenting an exemplary implementation of invention embodiments, and it will be apparent to the skilled person that invention embodiments are not restricted to this particular format.

The next paragraphs describe the role of each layer and their interaction.

1) Semantic Layer: The Semantic Layer 11 is the interface to client applications interacting with end users and is configured to relay user queries to the RDF processor. At this layer, data are seen not as individual RDF triples but at a conceptual level or even model level (as groups of related RDF triples). Semantic processing operations such as data reconciliation processing and property traversal are performed at this layer. More sophisticated ontological analysis, such as rule-based inference and description logic based inference may also be enabled when deep semantic analysis is necessary. In the an exemplary implementation, high level inferences may be realised through Jena and OWL2 RURDF. The Semantic Layer 22, however, is not bound to specific implementations and allows other inference engines to be easily plugged in. The semantic layer 11 provides the control functionality of the selection module, the reconciliation processing module, and the reconciliation processing control module mentioned elsewhere in this document.

2) RDF Layer: The RDF Layer 12 bridges the underlying data layer and the semantic layer. This may be implemented with an API such as Jena Graph API. The RDF layer 12 is configured to use methods that work directly with triples, e.g. add/remove triples and retrieve triples using RDF SPARQL queries. Also at the RDF layer 12 is a SPARQL engine, responsible for converting the text based query into a set of operations. These operations include low level search operations, filtering and joining mechanisms, among others. Some of these functionalities are implemented within the SPARQL engine in this layer, while low level data search is facilitated by the underlying Triple Adaptor Layer 14.

3) Triple Adaptor Layer: The Triple Adaptor Layer 14 is responsible for converting triples into a key that can be stored in the KVS Layer 15. This key should be unique and may also be comparable with other keys so as to reinforce an order (in which each key is greater than, lower than, or equal to any other key generated from a triple) over keys. The Triple Adaptor Layer 14 provides to the upper layer three simple operations: adding a new triple, removing an existing triple, and finding a set of triples according to specific criteria. The find operation is RDF specific, it receives three parameters, which can be either a specific value or null. For instance, find (subject; null; null) returns all the triples that have a specific (defined) subject. This layer uses the underlying KVS interface to store, remove and query data.

4) KVS Layer: The KVS Layer 15 implements a distributed, ordered key-value store. It offers a regular ordered hash map interface to add a key-value pair, to get or remove a key value (given some key) and additionally, to execute range queries over the ordered KVS. The range query method receives a prefix minimum key and a prefix maximum key, and returns an iterator over all key-value pairs contained within the given range. This layer is responsible for the distribution and retrieval of the data from other servers. This layer uses the underlying Communication Layer 16 to communicate with the other servers by passing messages.

5) Failure detector: The Failure Detector 13 is responsible for the execution of watchdogs that will detect a server failure and notify the Storage Layer of the surviving (not failed) servers. It uses also the Communication Layer 16 to exchange messages between other servers and produce a set of alive processes, also called a view of the system. When this view changes, the KVS Layer 15 is notified so that it can, for instance, trigger the recovery from failures. The failure detector 13 is very much optional in the context of embodiments of the present invention, and provides functionality which extends the functionality of invention embodiments.

6) Communication Layer: The Communication Layer 16 is a mechanism by which messages can be passed between servers (exemplary of storage units or computing devices mentioned elsewhere in this document). For example, the communication layer 16 may be configured to export primitives to send and receive messages to/from other servers. The skilled reader will appreciate that many alternative implementations can be used for this purpose.

Figure 2:
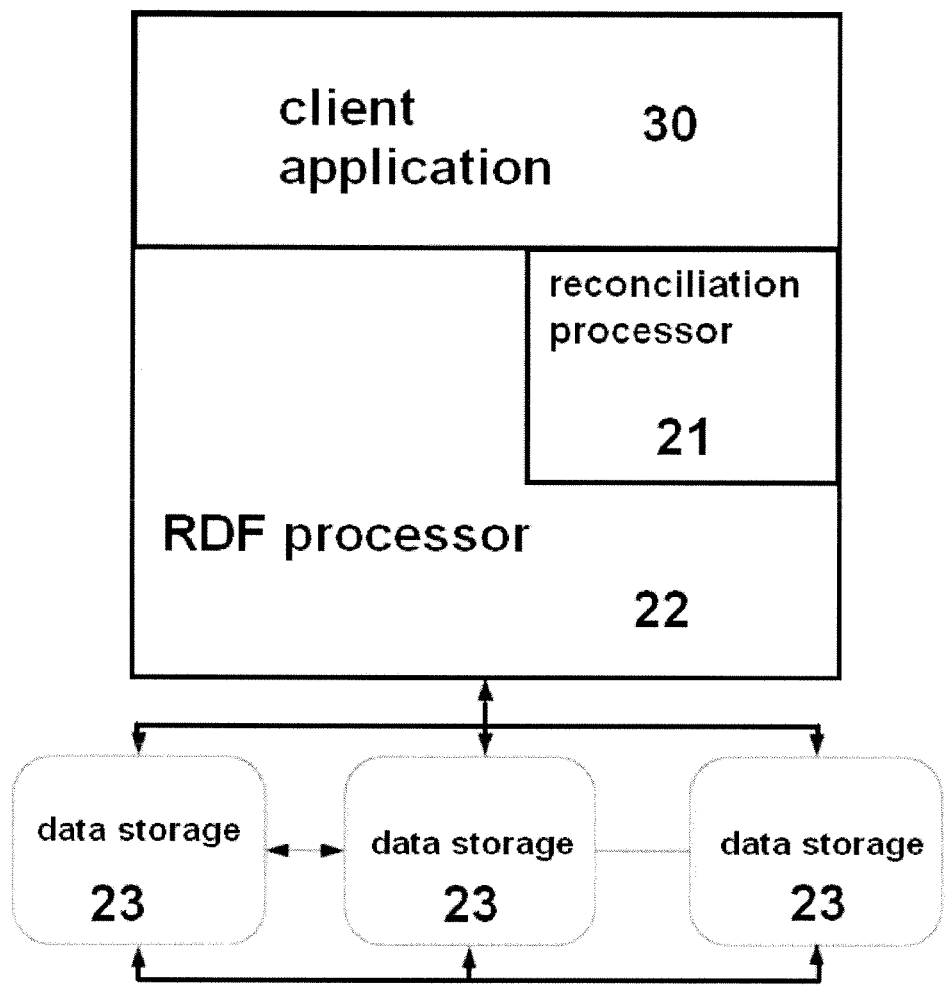
FIG. 2 illustrates a system architecture of an embodiment of the present invention in which certain of the control functionality is centralised.

FIG. 2 illustrates an alternative architecture, in which a client application 30 communicates with a single, centralised point of contact via a centralised RDF processor 22. The RDF processor 22 has the functionality of the RDF layer 12, but in the example of FIG. 2 it is implemented at a centralised-rather than a local-level. The reconciliation processor 21 (which combines the functionality of the selection module, the reconciliation processing module, and the reconciliation processing control module mentioned elsewhere in this document) is also implemented at a centralised level in the example of FIG. 2. The reconciliation processor 21 is configured to control and perform reconciliation processing for a graph stored in the plurality of data storage units 23. The plurality of data storage units 23 are at least configured to store a segment of a graph of data. In addition, the data storage units 23 may be configured to perform the functions of one or more of the triple adaptor layer 14, the KVS layer 15, the communication layer 16, and the failure detector 13 described above. FIGS. 1 and 2 illustrate that various functions of invention embodiments of the present invention can be carried out at either a local level or at a centralised level, depending on the requirements of the system in which the embodiment is implemented.

KVS is employed in the exemplary embodiment of FIG. 1 (and is equally applicable to FIG. 2) as an approach to scale-out the RDF data store, that is to say, the store of the graph of data. RDF triples themselves are, however, not KVS-ready. A first step is to define the key-value tuples that a standard KVS can conveniently utilise. In the following, an exemplary formalised data structure for a distributed store (graph) of data is set out.

Definition 1: RDF Triple. An RDF triple t, $\langle s, p, o \rangle$ (denoted as SPO) defines the relationship between a subject (s) and the object (o). The relationship is referred to using predicate (p). The subject (s) and object (o) are both nodes in the graph, and the predicate is an arc.

Triple is the fundamental data structure in RDF. As such, triples are an exemplary underlying data structure for storing a graph database (which may be taken to be a stored form of the graph) in embodiments of the present invention. However, the present invention may also be embodied or applied to embodiments in which an underlying data structure other than RDF triples is employed. The object of a triple can be either in turn the subject of other triples or of concrete data types such as string, integer, etc. Graph is a natural presentation of RDF triples. An RDF Graph is a directed, labelled graph. Vertices (nodes) of the graph are subjects or objects of triples and edges are predicates. In an RDF graph, both nodes and edges are also referred to as RDF Resources.

Definition 2: RDF Graph. Let T be a set of RDF triples. The graph representation of T is $G=\langle V, E \rangle$ where $V=\{v | \exists t \in T.(v \in \text{subject}(t) \cup \text{object}(t))\}$ and $E=\{(v_s, v_o) | (s, p, o) \in T\}$. V is defined as a set of nodes (or vertices) as subjects or objects of RDF triples while E is a set of edges (or arcs) between nodes usually specified as a pair of nodes $\langle v_1, v_2 \rangle$, $v_1, v_2 \in V$.

Generally speaking, KVS is a non-relational data model that allows storing schema-less data. Key benefits of KVS are simplicity and scalability. Data items in KVS are key-value tuples $\langle k, v \rangle$, where k is a unique identifier and v the payload that k identifies.

Definition 3: Triplified K/V (Key-Value) Tuple. Given a triple t, triplified K/V Tuple is $\{\langle k_1, \text{metadata} \rangle t | k_t \in \{\langle s, po, o \rangle\} \cup \{\langle p, o, s \rangle\} \cup \{\langle o, s, p \rangle\}\}$ where metadata stores triple metadata as the value of a key-value tuple.

As an example of a store of triples as an underlying data format for embodiments of the present invention, each triple of the form SPO is replicated by generating two semantically identical, but syntactically different variants in the form of $\langle p,o,s \rangle$ (denoted as POS) and $\langle o, s, p \rangle$ (denoted as OSP). This is under the consideration of query performance and fault recovery, and with a view to providing a mechanism for storing various forms of metadata utilised in certain embodiments of the invention.

Querying RDF data is normally done via range queries, replacing elements in triples with wildcards. For instance SELECT$\langle ?,?,? \rangle$ retrieves all the triples in the data store while SELECT$\langle ?,?,o \rangle$ returns all the triples with o as object. Replicating triples allows data being sorted according to not only subjects but also predicates and objects. This enhances query execution.

Triples are stored in a distributed KVS, in this specific implementation, with each triple and its variants as a key and the related metadata as a value. Such an approach facilitates flexible metadata modeling and management. As previously mentioned in this document, any other graph-based storage could have been used, preferably embodiments of the present invention are implemented in such a way that metadata can be stored and accessed via the graph-based storage. In the invention embodiments, metadata may be used to record node visit frequencies and co-occurrences of node pairs as explained below. In turn, the metadata is used to select which graph nodes to include in the initial subset of nodes, and which can have reconciliation processing with a particular node delayed.

The set of both the original triples of the form SPO and their replicas of the form POS and OSP is sorted and split into n segments, where n is the number of servers (or storage units) that will be used for storing the data, with each server responsible for one data segment. A hash function may be used to map segments of the data to servers.

In order to efficiently locate the segment where a specific triple or one of its variants should be placed, a Trie (a sorted Tree with search complexity bound to the size of string to be indexed) can be used, where each leaf of the Trie corresponds to a data segment. For example, a two stage mapping from a data item to the sever can be implemented. All the existing triples are organised and sorted using the Trie with the entire triple set being arranged in alphabetic order. Finding the correct data segment is then done by following the prefix associated with each node in the Trie. After retrieving the segment IDs, consistent hashing can be employed as a tool to map segments to server machines. Cascading the two mappings together, a function ($\gamma$) that is able to find every triple its destination storage machine: $\gamma$: t→IDmachine with implementation $\gamma$=consistent-hashing (trie-search(t)). This function maps a data item to a segment ID using the Trie structure and then the segment ID is mapped to a machine ID using consistent hashing. This method is used to store all the triple versions, as described in the following paragraphs.

Adding a triple includes the steps of locating the data segment in the ordered data space and inserting the key-value tuple to the corresponding machine (using $\gamma(\ )$ mapping). An exemplary algorithm for triple insertion is detailed below in Algorithm 1.

---
Algorithm 1: addTriple(t)
---

Require: $\gamma(\ )$
$m_1 \leftarrow \gamma(t.SPO), m_2 \leftarrow \gamma(t.POS), m_3 \leftarrow \gamma(t.OSP)$
store ($\langle t.SPO, metadata \rangle, m_1, m_2, m_3$) in $m_1$
store ($\langle t.POS, metadata \rangle, m_1, m_2, m_3$) in $m_2$
store ($\langle t.OSP, metadata \rangle, m_1, m_2, m_3$) in $m_3$

---

Arguments passed to a storage machine includes the triple or a variant of the triple and the identifiers (m1, m2, m3) of all the involved machines (for variants) which are kept in a server local storage index table for fault recovery. These procedures ensure that each triple SPO, POS and OSP is stored in the system in such a way that allows range queries using as prefix any combination of a subset of the triple data.

The mechanism of locating a triple is the same for retrieval and deletion. Since data is always ordered, it is possible to retrieve segment IDs needed to handle RDF range queries. Definition 5 sets out how a range query might be performed in this specific implementation.

Definition 5: Range query. Given two triples t1 and t2 and data segmentations D0, . . . , Dn, a range query retrieves all the triples between t1 and t2 inclusively as: $\{t|t \in D_i \wedge t_1 \in D_i \wedge key(t) \geq key(t_1)\} \cup \{t'|t' \in D_j \wedge t_2 \in D_j \wedge key(t') \leq key(t_2)\}$ where key( ) converts a triple to a key $\cup \{t''|t'' \in D_k \wedge (i<k<j)\}$ in KVS.

The segments that need to be visited are: the segment containing $t_1$, the segment containing $t_2$, and all the interim segments.

A delete operation is processed in a similar manner by replacing the "store" instruction in Algorithm 1 with "delete" on each of the servers. The "delete" instruction remove the row that corresponds to the triple and update the respective index table, if necessary.

The incremental approach to reconciliation of embodiments of the present invention may be implemented in an "event-driven" manner. An event is caused when "something" changes the state of a data store (for example a new triple is inserted or an existing triple is retrieved), a data store being the stored version of the graph. For the purpose of data reconciliation, two elementary events are considered as relevant events which can trigger reconciliation processing: addEvent and readEvent. addEvent is emitted by a triple insertion operation. readEvent is emitted by graph querying. Reconciliation is triggered as a reaction to these two events.

Other types of events that may impinge on data reconciliation can be represented as a series of addEvents and readEvents and thus are not defined separately. Of course, addEvent and readEvent are highly connected. When adding a triple to a non-empty graph, the related triples will be visited and evaluated to detect any data that should be reconciled, causing a series of readEvent to be emitted to the data storage. Such a close relationship is reflected in the exemplary manner for selecting the initial subset of nodes with which to perform reconciliation processing with a particular node set out below. readEvent is considered as a graph traverse operation. The traverse history is employed to establish an initial subset including the most-visited nodes and nodes having a strong co-occurrence relationship with the most-visited nodes. The algorithm for selecting the initial subset is an exemplary mechanism for selecting the initial subset, and is based on the assumption that if two nodes are strongly correlated (i.e. the probability of visiting node B after visiting node A in a graph traverse operation is very high), it is highly likely that reconciliation processing performed on A should be also be performed on B in the same routine, rather than being delayed. Following the paths of such correlated nodes using co-occurrence relationships an initial subset of nodes whose reconciliation is more imminent than that of other nodes can be selected.

The desirability of such a selection mechanism is evident. Even if the graph is stored across multiple servers, the size of data on an individual machine can be potentially very large, denying an exhaustive reconciliation action in real-time. The probability of co-occurrence between two arbitrary nodes can be used to partition the graph into a subgraph of frequently visited nodes and those having strong correlation with the most frequently visited nodes (initial subset), and one containing less visited nodes (further subset). For the latter, reconciliation checks are postponed until a direct read operation is performed. Hence, an incremental approach is enabled to reconciliation with respect to a large data graph.

By partitioning the graph into an initial subset and further subset, it is also possible to overlay segmentation of the data graph upon the physical data segmentation already in place. This usage-based segmentation further enhances parallel processing of data reconciliation.

Embodiments of the present invention may employ or create an extended graph, extended by some particular metadata fields/values which will be elaborated on below. The particular metadata fields provide information which can be used in differentiating the initial subset of nodes from the further subset of nodes.

Definition 4: Extended RDF Graph.
Extended RDF Graph is $G_e = \langle V', E' \rangle$ that extends RDF Graph $G = \langle V, E \rangle$ with node and edge metadata:

$$V' = \{\langle v, m_v \rangle | v \in V\}, E' = \{\langle e, m_e \rangle | e \in E\},$$

where V and E are as defined in Definition 2: RDF Graph.

Triples are treated as the underlying data structure in this particular implementation, and the Extended RDF Graph defined above requires node-local and edge local metadata. Since this implementation stores three variants of every triple, the metadata can be stored as follows:

Storing node and edge metadata: $m_v$ is stored locally to each SPO and OSP triple for nodes representing triple subject and triple object respectively. $m_e$ is stored locally to each PSO. Updating the metadata of an existing triple includes reading the triple metadata, recalculating the value, and putting the value back.

Querying node and edge metadata: When querying metadata about a particular node or edge, all the relevant triples are retrieved and the metadata is aggregated as appropriate.

For example, an indication of how many times a particular triple (t) is read can be maintained using a simple key-value tuple: $\langle k_t, \text{number\_of\_visits}\rangle$. If a functional module is required to assess the total number of visit to node s, all the key-value tuples having $\langle s,?,?\rangle$ as key (where ? matches any string) should be retrieved. The corresponding number_of_visits will then be summed up to give the final answer.

The normal RDF Graph is extended with metadata recording node visit frequencies and co-occurrences of node pairs. The use of frequency and co-occurrence is to reduce the number of nodes that a reconciliation process needs to visit initially and thus reduce computational cost at the time of triple insertion. This enables an incremental reconciliation technique that postpones non-urgent operations to the point when it becomes necessary. Node and edge metadata is used as a mechanism to signal how significant the nodes are among others and how closely the nodes are connected to each other.

Numeric values are incrementally added to the normal graph as a result of readEvent (triggered by data querying). Hereinafter, the normal data graph (RDF Graph) is denoted as G and extended graph $G'_i$ with i indicating how many iterations (triggered by readEvent and addEvent) have been applied to the original graph causing the incremental graph transformation.

Definition 6: Frequency, co-occurrence, pending request.

Let t be a triple $\langle s, p, o\rangle$ and s and o be two nodes resulted from the graph representation of t. The frequency, f(s), is the total number of visits to the subject node s. The co-occurrence $$co(s, o) = \frac{m}{f(s)},$$

where m is the total number of times that a particular triple $\langle s, p, o\rangle$ has been visited/queried with s as the subject.

$L_t=[t_0; \ldots, ti, \ldots, tn]$ is a list of triples containing all the ones yet to be reconciled at the node. $L_t$ can be empty.

The co-occurrence between node s and node o is approximated as, out of all the visits on node s, how many have led to the visit of node o. At the underlying storage level, the metadata is associated with triples forming key-value tuples, where frequency and pending request is implemented as node metadata (i.e. $\langle v, f: L_t\rangle$) while co-occurrence is realised through edge metadata as $\langle e, co\rangle$. Of course, these are merely exemplary techniques for storing metadata required to identify the most-visited nodes and the nodes visited after the most-visited nodes in graph traverse operations. The skilled reader will appreciate that various different values stored as metadata in different locations could be used for the same purpose.

The addEvent and readEvent is handled by the system differently. As adding a triple to a graph normally leads to a series of queries being issued and potentially new triples being generated and added, an instance of addEvent can be considered to be a sequence of updates on frequency and co-occurrence values. Theoretically, such a ripple-off effect will terminate only if no more nodes need to be processed.

Let t be a triple $\langle s, p, o\rangle$ equivalent to a directed edge going from the subject node to the object node. Each read operation on the graph incrementally changes the frequency value f(s) of the node that has been visited and the co-occurrence relation co(s,o) between neighbouring nodes in $G'_i$. The rationale is that by using the co-occurrence association rule, a decision can be made as to whether reconciliation processing performed with respect to node s will/should be propagated to the neighbouring nodes connecting to s, or whether reconciliation processing of those neighbouring nodes should be delayed.

Figure 3:
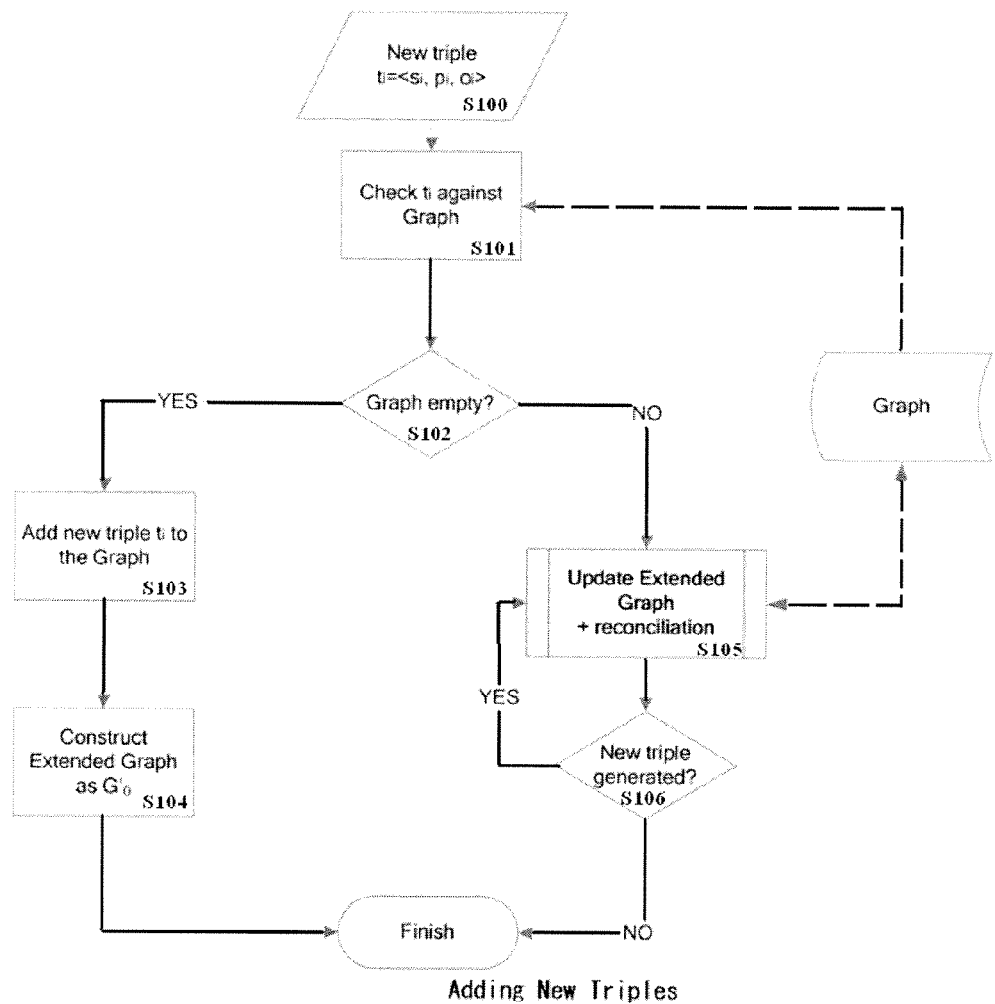
FIG. 3 is a flowchart illustrating the processing carried out in adding a new triple to an underlying data store in an embodiment of the present invention.

FIG. 3 illustrates a flow of control in the process of adding a new triple to a graph.

When adding a triple to an empty graph, no reconciliation is needed, S101-S103, 'YES' at S102. The extended graph is then initialised as the plain RDF graph in step S104. When adding a triple to an existing graph, 'NO' at S102, the extended graph is updated at S105 insofar as a corresponding frequency of the subject node and the co-occurrence of the edge connecting the triple subject and object are increased by 1. Reconciliation processing is performed at S105, if necessary. At this stage, it may be that an initial subset of nodes is selected and reconciliation processing performed between the initial subset of nodes and the subject node of the new triple. An exemplary flow of control for the processing within S105 is provided in FIG. 4, as discussed below, and formalised in algorithm 2. In many cases, reconciliation processing may result in producing new triples, 'YES' at S106, that in turn should incur metadata update and new reconciliation processing. This will continue until no new knowledge (triple) is generated. This process is formalised in Algorithm 2. Note that due to the nature of KVS, adding to existing key-value pairs simply updates the values of the tuples.

In terms of apparatus carrying out certain procedures, the selection of an initial subset may be performed by a selection module. The reconciliation processing, including the similarity calculations, their aggregation, and the creation of new equivalence links where appropriate, may be performed by a reconciliation processing module. The identification and scheduling of further (delayed) reconciliation processing, including responding to certain trigger events and identifying the reconciliation processing that should be performed in response to a trigger event, is performed by a reconciliation processing control module. Each of the modules may be realised as part of a database controller which may be local to a storage unit/server/computing resource in a distributed system, or may be centralised and provided on a centralised piece of hardware or by distributed hardware/computing resources/servers cooperating to create an effective centralised controller. The modules may be realised as hardware, or may be software modules operating on a computing resource/server/storage unit, for example, as part of a database management system.

Data/semantic reconciliation mainly happens when new instance data are asserted. When adding a triple $t=\langle s, p, o\rangle$, an addEvent instance triggers reconciliation of the subject s of the inserted triple t to be performed against the entire graph. In practice, the size of a graph that one needs to process against can easily reach millions of nodes and become too large to allow exhaustive traversing. By focusing selecting an initial subset with which reconciliation of the particular node, in this case the subject of the new triple, is to be performed initially, the upfront processing burden is reduced and a less expensive initial reconciliation approximation obtained.

```
Algorithm 2 doAddEvent (t =⟨s, p,o⟩)
Require: G =⟨V, E⟩ as the RDF graph
Require: addTriple( ) (Algorithm 1)
    if G == 0 then
        // no reconciliation is necessary
        addTriple(t)
        initialise G₀' where V' = V and E' = E
        G₀' ← G₀' ∪{⟨s, f₀(s) = 0⟩,⟪s,o⟫,co₀ (s,o) = 0⟩ }
        return
    end if
    if s ∈ V'then
        fᵢ (s) = fᵢ₋₁(s) + 1
        if⟨s,o⟩∈ E' then
            coᵢ(s,o) = coᵢ₋₁(s,o) + 1
        else
            coᵢ(s,o) = 0
        end if
    else
        fᵢˢ = 0
    end if
    Gᵢ' ← Gᵢ₋₁' ∪{⟨s,fᵢ(s)⟩,⟪s,o⟫,coᵢ(s,o)⟩ }
    addTriple(t)
    reconcile(t) against Gᵢ'
    if new triples are generated then
    new addEvent.fire( )
    end if
Algorithm 3 reconcile(t) t =⟨s,p,o⟩
Require: α and β as predefined thresholds
    S ← {v ∈ V'|fᵢ (v) > α}
    for every v'∈ S do
        doReconciliation (s,v')
    end for
    for every v"∈ V' / S do
        if ∃v'∈ s.⟨v',v"⟩∈ E'∧ coᵢ(v',v") > β then
            doReconciliation(s,v")
        else
            record(v",t)
        end if
    end for
    update the metadata of G'
```

Algorithm 3 is an exemplary algorithm for selecting an initial subset of nodes with which reconciliation processing with a particular node is carried out, and recording an indication of the particular node at the nodes that are not part of the initial subset, so that they can be reconciled with the particular node on-demand in the future (i.e. reconciliation processing is delayed).

Figure 4:
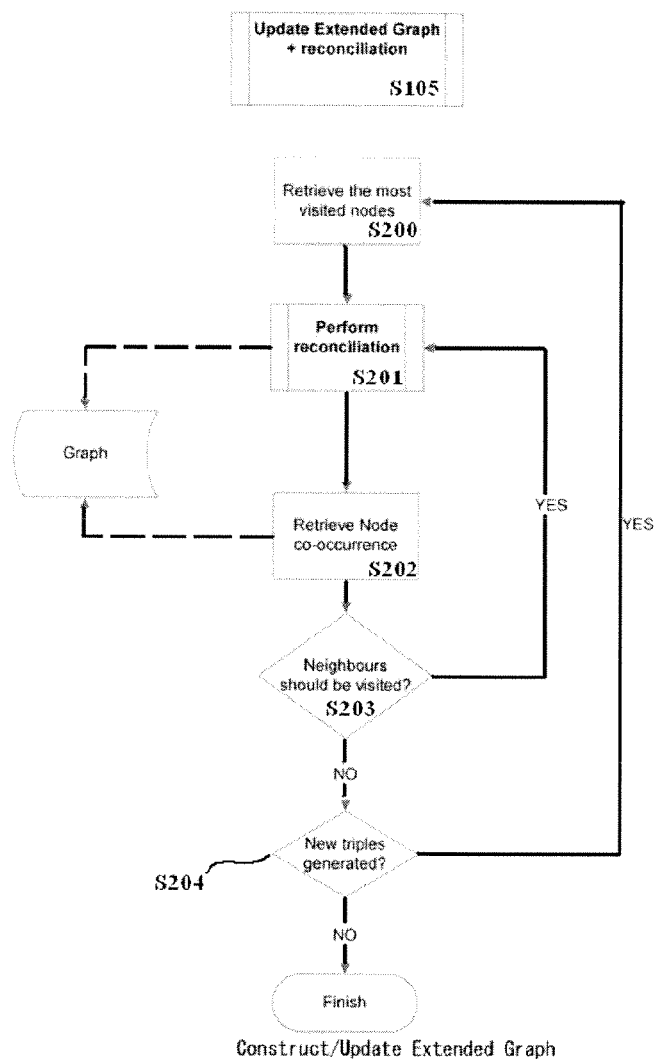
FIG. 4 is a flowchart illustrating the processing carried out in updating the extended graph and performing reconciliation processing in an embodiment of the present invention.

FIG. 4 illustrates a flow of control corresponding to algorithm 2, and to the processing occurring as part of S105 of FIG. 3. That is to say, FIG. 4 illustrates a flow of control for performing reconciliation processing for a particular node (for example, the subject node of a new triple) with the Graph, and updating the extended graph. At S200, the most-visited nodes are retrieved. Reconciliation processing between the particular node and the most-visited nodes is performed at S201, whilst node co-occurrence is retrieved/calculated at S202, and the nodes neighbouring the most-visited nodes that have co-occurrence frequencies with the respective most-visited node above a predetermined threshold ('YES' at S203) are also reconciled with the particular node at S201 as part of the initial subset. The processing performed at S201 is illustrated in more detail in the flowchart of FIG. 5 and in Algorithm 3. Once there are no remaining most-visited nodes or neighbours of most-visited nodes having co-occurrence with the most-visited node above a threshold, a check is performed for whether the generation of new triples as part of reconciliation processing has resulted in new most-visited nodes, so steps S200 to S203 are repeated. This is known as the "ripple effect" and continues until no new triples are added as part of reconciliation processing. The reconciliation processing between the rest of the nodes and the particular node is delayed. As set out in Algorithm 2, an indication of the particular node is recorded at each of the nodes with which reconciliation processing is not performed as part of steps S200 to S204, so that those nodes can be reconciled incrementally after a delay.

The rationale behind this incremental approach is that reconciliation is only performed for the nodes that are frequently visited in the past and their neighbours that are strongly correlated with them (through co-occurrence). Reconciliation of other nodes is postponed until they are visited or until an exhaustive reconciliation request is made explicitly. As shown in Algorithm 3, a subset of most frequently-visited nodes S are identified using the frequency values.

Reconciliation is performed against this initial subset of most frequently visited nodes. All the unprocessed nodes that are strongly connected to frequently visited ones (over a predefined threshold β) are reconciled against the particular node, the strongly connected nodes may be part of the initial subset, but in some embodiments it may be that the initial subset is only the most frequently visited nodes, and that the strongly connected nodes (those having a co-occurrence relation co(s,o) with a most-visited node above a threshold) are part of the further subset of nodes for which reconciliation processing with the particular node is delayed.

Reconciliation of all the remaining nodes will be postponed till the time that they are visited explicitly, an exhaustive reconciliation approach is made in respect of the particular node, or reconciliation processing is carried out in response to an indication that the system is idle or has spare processing capacity. The unperformed reconciliation, however, is recorded locally at each node using record( ). This will allow one-pass reconciliation when it becomes necessary or favourable.

Figure 5:
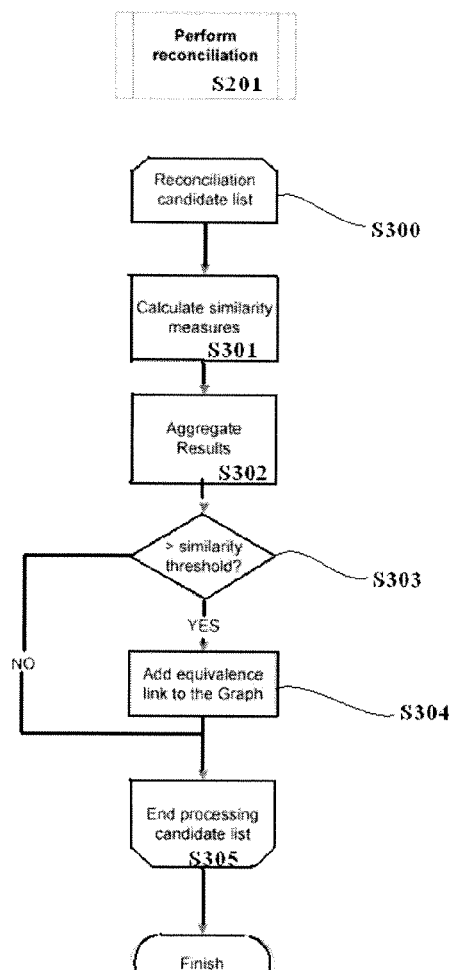
FIG. 5 is a flowchart illustrating an exemplary process for performing reconciliation processing in an embodiment of the present invention.

The reconciliation doReconciliation(s,v') for v'∈V'ₖ consists of two specific parts: similarity calculation and aggregation of results. FIG. 5 is a flowchart setting out the processing performed as part of the "perform reconciliation" of step S201 of FIG. 4. The reconciliation processing is formalised in Algorithm 3 above. Algorithm 3 and FIG. 5 set out exemplary reconciliation processing in a specific implementation of an invention embodiment. Of course, many alternative reconciliation processing routines can be performed in embodiments of the present invention. The reconciliation candidate list is obtained at step S300. This is, for example, the initial subset of nodes, or all or part of the further subset of nodes. At step S301, similarity measures are calculated, or similarity calculations are performed. The similarity calculations may be a set of similarity measures to determine to what extent the two resources s, v' are equivalent. Each similarity calculation produces a score denoting the degree of similarity between the two resources (or the likelihood that the particular node s and another node v' are equivalent), so similarity(s; v')=σ with a as the score in [0, 1] where 0 denotes that two entities are different and 1 denotes they are equivalent (describe the same real world object). The similarity calculations can then be combined, for example, by simple aggregation or by weighted average, to obtain a similarity value.

The similarity calculation can be based on different similarity measures, most involve various string similarity metrics, widely used in both record linkage and schema matching. String similarity metrics may include the Levenshtein Edit distance, which measures the number of primitive change operations needed to transform one string value into another, and/or the Jaro metric, designed to take into account common spelling deviations. These two are merely a sample of the many similarity measures embodiments can use to perform reconciliation of resources. On the aggregation of results, for each pair (s, v', score), the reconciliation obtains, for example, an aggregated similarity value equivalent (s, $v_i$, weighted_score) as a weighted average of these similarity measures. Only if the similarity value is above a chosen similarity threshold (S303), similarity_th, will the candidate equivalence link be selected and added in the graph. The similarity_th denotes the minimum value of similarity needed in order to consider a pair of object descriptions as similar one to the other.

Postponed reconciliation is handled in either or both of two different manners:

i) "on-demand" and "on-node" reconciliation triggered by readEvent (queries); and ii) forced reconciliation at system idle time. In the extreme cases, it is possible that no reconciliation is done at the time of triple insertion, i.e. all the reconciliation can be postponed to the system idle time or the point of explicit querying.

1) Querying Graph with Pending Reconciliation Requests:

The incremental reconciliation approach which is used in embodiments of the present invention includes postponing or delaying reconciliation processing between a particular node with which it has been determined that reconciliation with the existing nodes in the graph should be carried out, and at least some of the nodes in the graph, until a time point when it becomes really necessary or favourable. As explained above, it may be that the particular node is the subject node of a new triple being inserted into the graph. At the time of insertion, the particular node may only have reconciliation processing performed between itself and the most frequently visited nodes/resources and their strongly correlated neighbours. Reconciliation against all the remaining nodes is delayed for "on-demand" consideration.

As a mechanism by which the delayed reconciliation processing can be identified and scheduled, these pending requests may be stored in either or both of two different locations. Effectively, the additional storage space required for this mechanism is traded off against time efficiency and processing performance.

Firstly, the triples initiating a data reconciliation process are stored at each unvisited node of the extended graph as node metadata (see Definition 4 and Definition 6). By storing pending requests locally at the node (in list $L_t$), further reconciliation can be proceeded locally at each node and on demand, i.e. the fact that there is delayed processing in respect of a node can be ascertained by reading the metadata stored for that node, and the delayed processing can be scheduled accordingly.

Secondly, the system maintains a list of newly added triples that are not yet completely reconciled (wherein a completely reconciled triple or node is one for which reconciliation processing with each of the other nodes in the graph has been performed) into the graph. This list is referred to as the queue (or cache) of un-reconciled triples, Q=[t0, . . . , tm].

Figure 6:
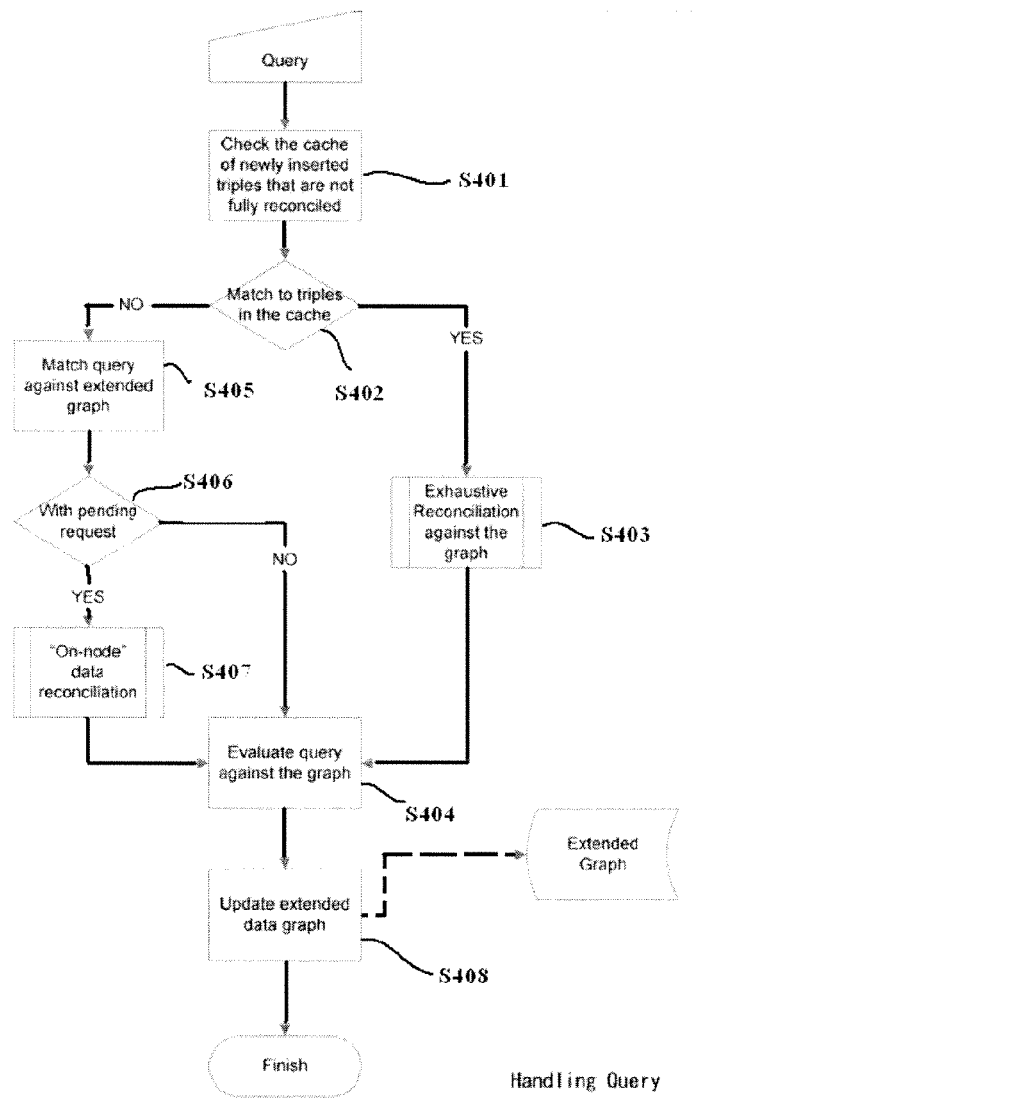
FIG. 6 is a flowchart illustrating an exemplary process for receiving and handling a query in an embodiment of the present invention.

FIG. 6 is a flowchart setting out processing performed upon receipt of a query to the graph, in order to ensure that reconciliation processing in respect of nodes to be retrieved in response to a query has been carried out against all other nodes in the graph.

When querying, a query (q) is first checked against the members in Q, at steps S401 and S402.

The condition to be satisfied for the query to be deemed to include an element in Q may take the form:

$$(\exists t_j \in Q . t_j = a \vee similarity(t_j, q) \geq \delta)$$

where $\delta$ is a predefined numeric threshold. Essentially, if the query equals an element in Q or is significantly similar to an element in Q (where the threshold similarity is given by $\delta$), then data reconciliation of the node in question is enforced against the entire graph. The provision of a similarity threshold provides flexibility when checking whether Q contains the target query.

Figure 7:
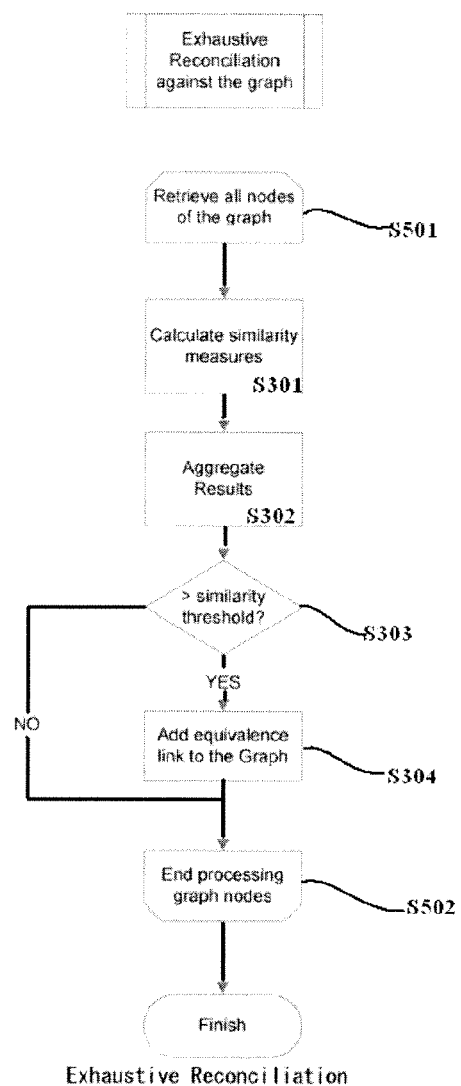
FIG. 7 is a flowchart illustrating an exemplary process for carrying out exhaustive reconciliation for a node in an embodiment of the present invention.

If Q contains the query (i.e if the above condition is satisfied), 'yes' at S402, the flow proceeds to S403 and data reconciliation of the queried node that is a member of Q, tj, is reinforced against the entire graph. Note that this 'exhaustive reconciliation' effectively defines a 'worst case scenario' in terms of the amount of reconciliation processing that must be performed on receipt of a query. However, in most implementations the size of Q is expected to be much smaller comparing to the graph. Forced exhaustive graph reconciliation, therefore, should not happen frequently. In addition, at the system idle time queued un-reconciled triples are removed and processed, further reducing the chance that a query finds itself in the 'worst case scenario'. Furthermore, it is the case that exhaustive reconciliation is required at this point due to the identification of the node in a query, hence the processing is efficient in terms of the fact that the reconciliation is in respect of a node that is being accessed. After the exhaustive reconciliation at S403 (an exemplary process of exhaustive reconciliation is set out in more detail in FIG. 7), the flow proceeds to S404, and the query is evaluated and nodes read.

If the answer is 'no' at S402, and there is no overlap between the query q and the queue Q, the flow proceeds to S405 and it is evaluated against the extended graph. At steps S405 and S406, a check is carried out to identify whether any of the nodes being queried have "on-node" indications (identified in queue Lt stored in the metadata) of nodes with which they have pending/delayed reconciliation processing. as soon as an un-reconciled node (nodes in the extended graph with pending reconciliation) is encountered, "on-node" data reconciliation processing is performed is performed at S407. An exemplary processing for the "on-node" data reconciliation processing is set out in FIG. 8.

At step S408, during query evaluation, metadata of the extended graph is updated in terms of frequency, co-occurrence and both node-local and global cached pending reconciliation requests.

Figure 8:
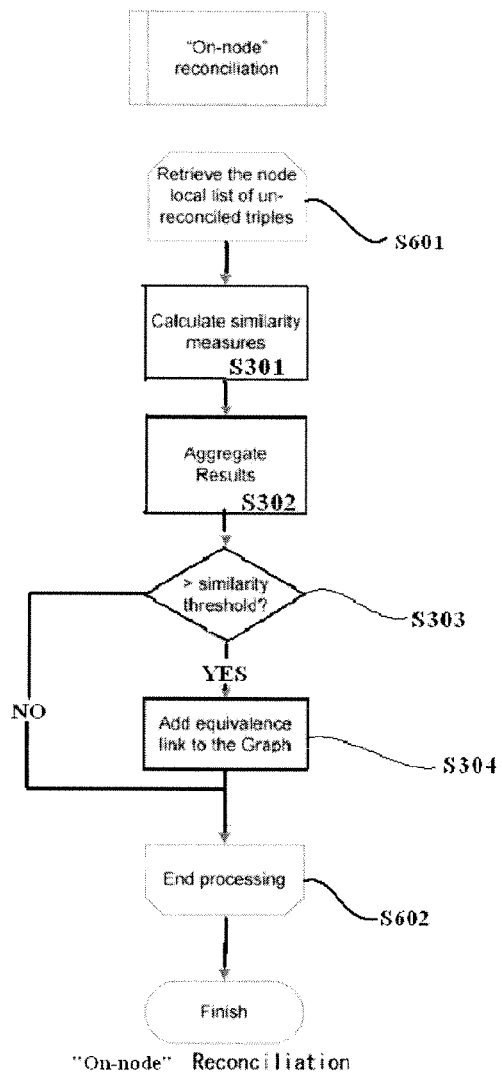
FIG. 8 is a flowchart illustrating an exemplary process for carrying out "on-node" reconciliation processing in an embodiment of the present invention.
Figure 9:
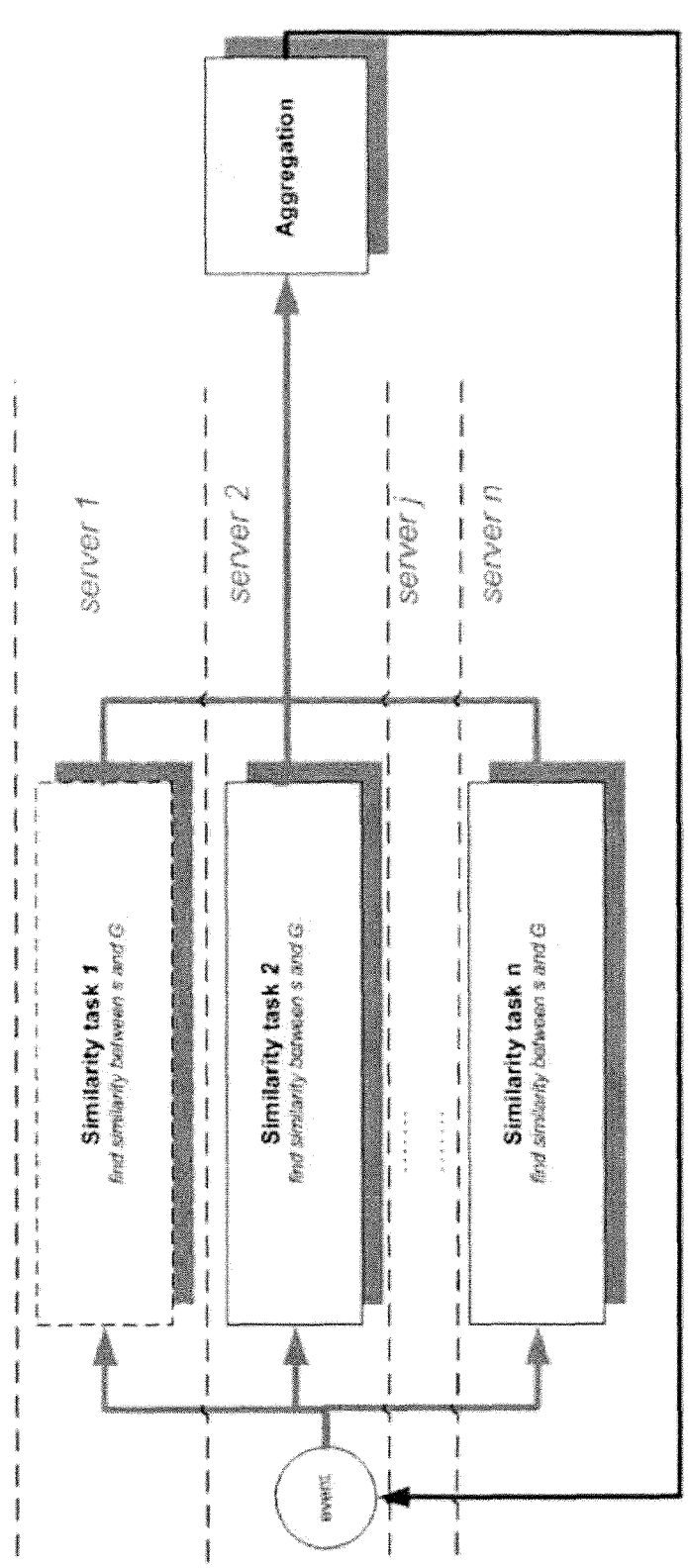
FIG. 9 is a conceptual illustration of parallelisation of reconciliation processing.

As can be seen from FIGS. 8 and 9, the reconciliation processing that must be performed in each case is largely the same as the reconciliation processing set out in FIG. 5, and the same numerals have been used for directly equivalent steps. The difference is merely in the candidate nodes with which reconciliation processing with the particular node is to be carried out.

2) Reconciliation at Idle Time: Apart from the "ondemand" and "on-node" data reconciliation forced by queries, the incremental approach also enables a better utilisation of the computing resources. By monitoring the entire system, it is possible to identify time slots when computing resources are at idle, or in an operating state which is determined to have sufficient processing capacity to add reconciliation processing to the workload of the computing resource. Pending reconciliation can be identified, scheduled, and performed either against the entire graph if necessary and appropriate or incrementally using again the frequency and co-occurrence values. Note that reconciliation also causes the update of the extended graph metadata. Reconciliation at idle time may be either or both of "on-node" reconciliation and exhaustive reconciliation.

Implementing an event-driven approach has the important characteristic that allows the existence of several similarity tasks to run simultaneously on different and distributed internetworked nodes. This differentiates it from other approaches. The use of events is the main vehicle to organise component intercommunication. Parallelisation of semantic operation is achieved through a two-dimensional data segmentation.

Firstly, the original data graph is distributed over multiple physical storages, enabling a 'vertical' segmentation of data when reconciliation is performed. Different similarity tasks can be performed by remote servers that are linked through a communication network and such tasks can be run in parallel. Distribution and parallelisation are features of an event-driven system that can help in speeding up the execution time of the entire reconciliation process. Reconciliation processing can be performed by a computing resource triggered by a read events or add event in respect of a particular node not yet having been reconciled with all nodes on that computing resource. More than one computing resource can perform such reconciliation processing in respect of the same particular node at one time.

FIG. 9 is an illustration of parallelisation of reconciliation processing across a number of servers. Reconciliation processing is triggered by an event, which may be the insertion of a new triple to the underlying data storage, in which case the subject of the triple becomes the "particular". The performance of similarity calculations and the processing required to obtain a similarity value based on those calculations may be performed at each server between the particular node and nodes of a selected candidate list (for example, the initial subset, or in the case of exhaustive processing, all of the graph) that are stored on that server. In that sense, the reconciliation processing is broken up into a number of similarity tasks (similarity tasks 1 to n) that are performed in parallel at the individual servers. The results are then aggregated and the graph updated with equivalence links where appropriate, which may give rise to another "event" triggering more reconciliation processing.

Figure 10:
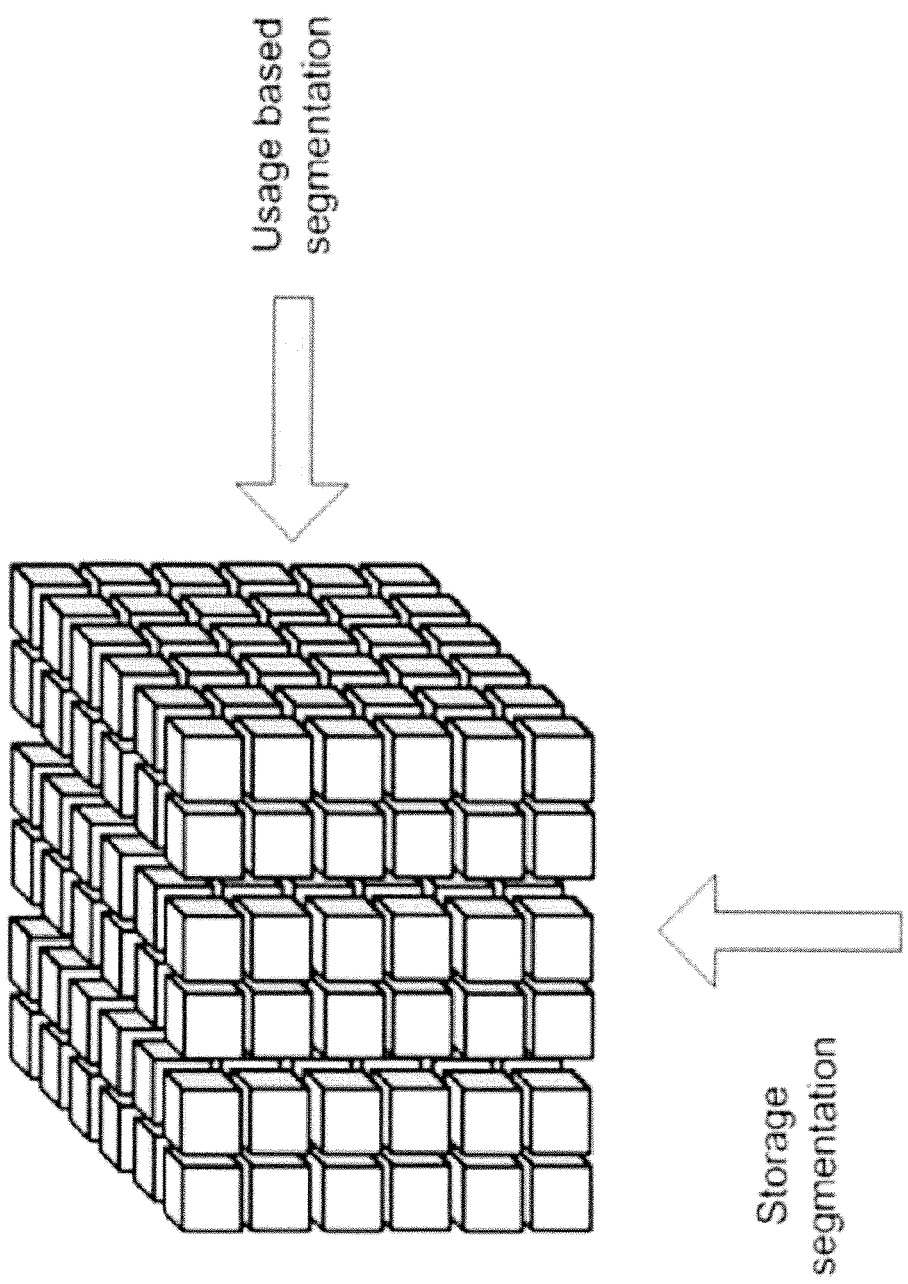
FIG. 10 is a conceptual illustration of segmentation of data enabled by physical distribution of data and by utilising values stored as metadata.

Secondly, the extended graph offers an enhanced capability for parallelisation through an abstract and dynamic layer of data partitioning. By using the frequency and co-occurrence values stored as metadata in the extended graph G' as a discriminator, it is possible to impose a data segmentation orthogonal to the underlying physical one acquired through distributed data storage. The data in the graph are then effectively diced into smaller pieces for reconciliation processing, with each dice of data defining the boundaries within which a routine of reconciliation processing is confined (as illustrated in FIG. 10). This second segmentation is desirable because even if the graph is stored across multiple machines, the size of data on individual machine can be potentially very large denying an exhaustive reconciliation action in real-time. The probability of co-occurrence between two arbitrary nodes can be used to partition the graph into a subgraph of frequently visited nodes (an initial subset) and one containing less visited nodes (a further subset). For the latter, reconciliation processing is delayed or postponed until a direct read operation is performed, or until system idle time. Hence, an incremental approach is enabled that can potentially parallelise the semantic data reconciliation processing. Overlaying upon the physical storage segmentation already in place, this usage-based segmentation further enhances parallel processing of data reconciliation.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A method for performing reconciliation of resources represented in a graph of data as nodes, the method comprising:
    selecting an initial subset of the nodes of the graph for which reconciliation processing with a particular node is to be carried out by determining which of the nodes have the highest number of read accesses made to them in graph traverse operations, and including those nodes in the initial subset as most visited nodes;
    performing reconciliation processing between the particular node and each of the initial subset of nodes; and
    delaying reconciliation processing between the particular node and a further subset of the nodes of the graph for which reconciliation with the particular node is to be carried out.

2. A method according to claim 1, wherein
    selecting the initial subset also includes determining which of the nodes have the highest probability of having a read access made to them as the next node after one of the most visited nodes in a graph traverse operation.

3. A method according to claim 1, wherein
    the further subset of the nodes is all of the nodes in the graph that are not members of the initial subset.

4. A method according to claim 1, wherein
    the reconciliation processing of the further subset of the nodes is delayed and performed during time slots when monitoring of computing resources indicates the computing resources would otherwise be idle.

5. A method according to claim 1, further comprising:
    adding an identification of the particular node to a list;
    maintaining the identification of the particular node in the list until processing with the further subset of the nodes of the graph has been carried out, whereupon the identification of the particular node is removed from the list; and
    when a query to the graph is received identifying one or more nodes to be read, checking which of the one or more nodes to be read are identified on the list, and for each of the one or more nodes to be read that is identified on the list, carrying out reconciliation processing with each node of the graph.

6. A method according to claim 1, further comprising:
    for each node of the graph not included in the initial subset with which reconciliation processing is carried out, adding an identification of the particular node to a list of unreconciled nodes in the associated metadata, and maintaining said identification in said list until reconciliation processing with the particular node is carried out, whereupon the identification of the particular node is removed from said list; and when a query to the graph is received identifying one or more nodes to be read, for each of the nodes to be read, carrying out reconciliation processing between that node and each of the nodes identified in the list of unreconciled nodes in the associated metadata.

7. A method according to claim 1, wherein the graph is stored in a distributed network of computing resources.

8. A method according to claim 7, wherein reconciliation processing of the particular node with another node comprises:

obtaining a similarity value by aggregating the values resulting from performing a plurality of different similarity calculations, or obtaining a single value resulting from performing a similarity calculation, wherein a similarity calculation is a calculation generating a value representing the likelihood that the particular node and the another node are semantically equivalent; and if the similarity value exceeds a predetermined similarity threshold, adding an equivalence link to the graph denoting an equivalence relationship between the particular node and the another node.

9. A method according to claim 8, wherein reconciliation processing is performed simultaneously on more than one computing resource within the distributed network of computing resources, between the particular node and the nodes being stored on that computing resource and belonging to the subset of nodes for which reconciliation processing with the particular node is being performed.

10. A method according to claim 1, further comprising storing, for each node, as associated metadata, a value representing the numbers of read accesses made to the node in graph traverse operations, and a value representing the number of times each node to which the node is linked in the graph was read as the next node in a graph traverse operation.

11. A method according to claim 1, wherein the data in the graph is encoded as triples each comprising a subject, a predicate, and an object, and the nodes of the graph are the subjects and objects of the triples, and the predicate of a triple denotes a link between the subject and the object of the triple.

12. A database controller for performing reconciliation of resources represented in a graph of data as nodes, the database controller comprising:

a selection module configured to select an initial subset of the nodes of the graph for which reconciliation processing with a particular node is to be carried out by determining which of the nodes have the highest number of read accesses made to them in graph traverse operations, and including those nodes in the initial subset as most visited nodes;

a reconciliation processing module configured to perform reconciliation processing between the particular node and each of the initial subset of nodes; and a reconciliation processing control module configured to delay reconciliation processing of a further subset of the nodes of the graph for which reconciliation with the particular node is to be carried out.

13. A data storage system for storing a graph of data in which resources are represented as nodes of the graph, the data storage system comprising:

a plurality of storage units each configured to store a segment of data from the graph of data; and a database controller according to claim 12.

14. A computer program which, when executed by a computer, causes the computer to perform a method for performing reconciliation of resources represented in a graph of data as nodes, the method comprising:

selecting an initial subset of the nodes of the graph for which reconciliation processing with a particular node is to be carried out by determining which of the nodes have the highest number of read accesses made to them in graph traverse operations, and including those nodes in the initial subset as most visited nodes;

performing reconciliation processing between the particular node and each of the initial subset of nodes;

delaying reconciliation processing between the particular node and a further subset of the nodes of the graph for which reconciliation with the particular node is to be carried out.

15. A computer program which, when executed by a computer, causes the computer to function as the database controller according to claim 12.

* * * * *